Feb. 15, 1966　　　A. F. KASPAUL ETAL　　　3,235,398
PROCESS FOR RECORDING INFORMATION CONVEYED
BY INFRARED RADIATION
Filed May 3, 1962　　　　　　　　　　　　2 Sheets-Sheet 1

INVENTORS
ALFRED F. KASPAUL
ERIKA E. KASPAUL
BY Frank A. Steldt
John W. Kooster
ATTORNEYS

INVENTORS
ALFRED F. KASPAUL
ERIKA E. KASPAUL

United States Patent Office 3,235,398
Patented Feb. 15, 1966

3,235,398
PROCESS FOR RECORDING INFORMATION CONVEYED BY INFRARED RADIATION
Alfred F. Kaspaul and Erika E. Kaspaul, Stamford, Conn., assignors to Minnesota Mining and Manufacturing Company, St. Paul, Minn., a corporation of Delaware
Filed May 3, 1962, Ser. No. 192,273
5 Claims. (Cl. 117—37)

This invention relates to a process for permanently recording upon a solid substrate information conveyed by infrared radiation.

The art appreciates that radiant energy can be used to convey information in several ways. Thus, infrared radiation may be used to convey information imagewise, for example, the image of a heated filament or other warm physical object. It may also convey information indiciawise or symbolically as, for example, dots and dashes, letters, numerals, and the like. Since infrared radiation is associated with heat, the intensity and wavelength involved are a measure of temperature, and consequently infrared radiation also conveys thermal information.

It is an object of this invention to provide a method for recording of thermal information. Another object of the invention is to provide a method for the imagewise recording of information. A further object of the invention is to provide a method for recording information conveyed by infrared radiation. Other objects will become evident from the disclosure hereinafter made.

It has been found that these and other objects of the invention are achieved by passing infrared radiation whose information content to be recorded through a focussing system so as to form a real image of the incident infrared radiation upon a solid substrate which may advantageously be cooled prior to exposure. Concomitantly, a source of supply of metal is placed near the substrate and converted to vapor form. This vapor selectively deposits upon the substrate in those regions on which the infrared image does not impinge. This effect can be reversed by suitable selection of the substrate and vaporized metal so that either a positive or negative image can be obtained as more fully described hereafter. The entire operation of image formation upon a suitable substrate and concurrent selective vapor deposition upon the substrate is carried out under conditions of reduced pressure.

The invention is further understood by reference to the drawings in which.

Figure 1:
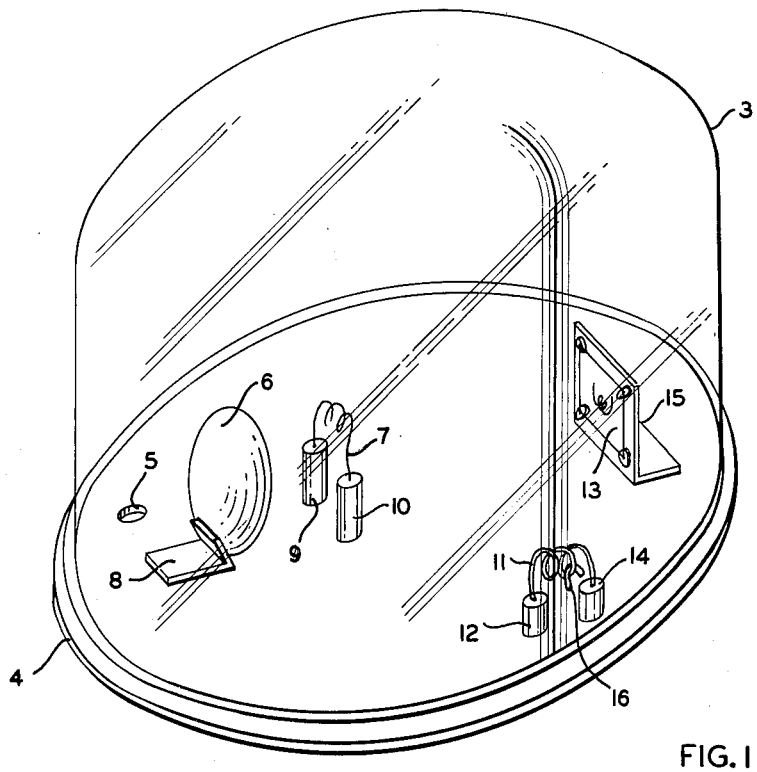
FIGURE 1 is an embodiment of the invention wherein information-bearing infrared radiation is recorded by means of an apparatus maintained under reduced pressure which comprises, in combination, a source of information-bearing infrared radiation, a catoptric focussing system, a substrate for image recording, and a source of vapor suitable for development.

Shielding of the substrate from infrared radiation emitted by the heated developer source may be accomplished by any suitable baffling means, arranged to prevent the said source radiation from impinging directly on the substrate. Since such a source will only effect substantially uniform exposure over the entire surface of the image-recording substrate, it will cause a graying of the entire substrate which may be insignificant. This can be decreased by placing the developer source so that the angle of incidence of radiation therefrom on the substrate is very low. Shielding means are not shown in the drawings.

Figure 2:
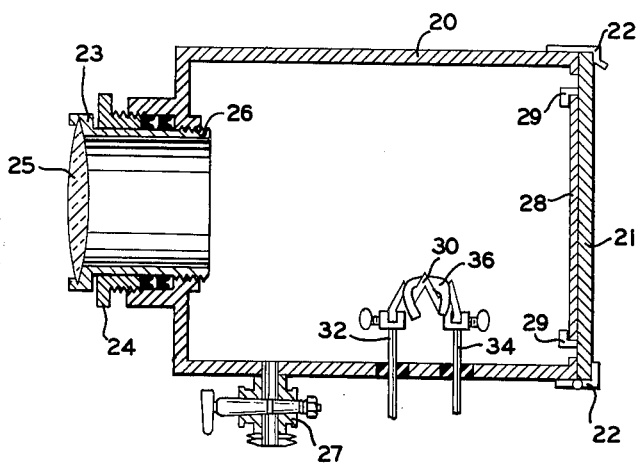
FIGURE 2 is another embodiment of the invention wherein a source of information-bearing infrared radiation is recorded in an apparatus in which a lens is used and the source of information-bearing infrared radiation is external to the housing of the recording apparatus.
Figure 3:
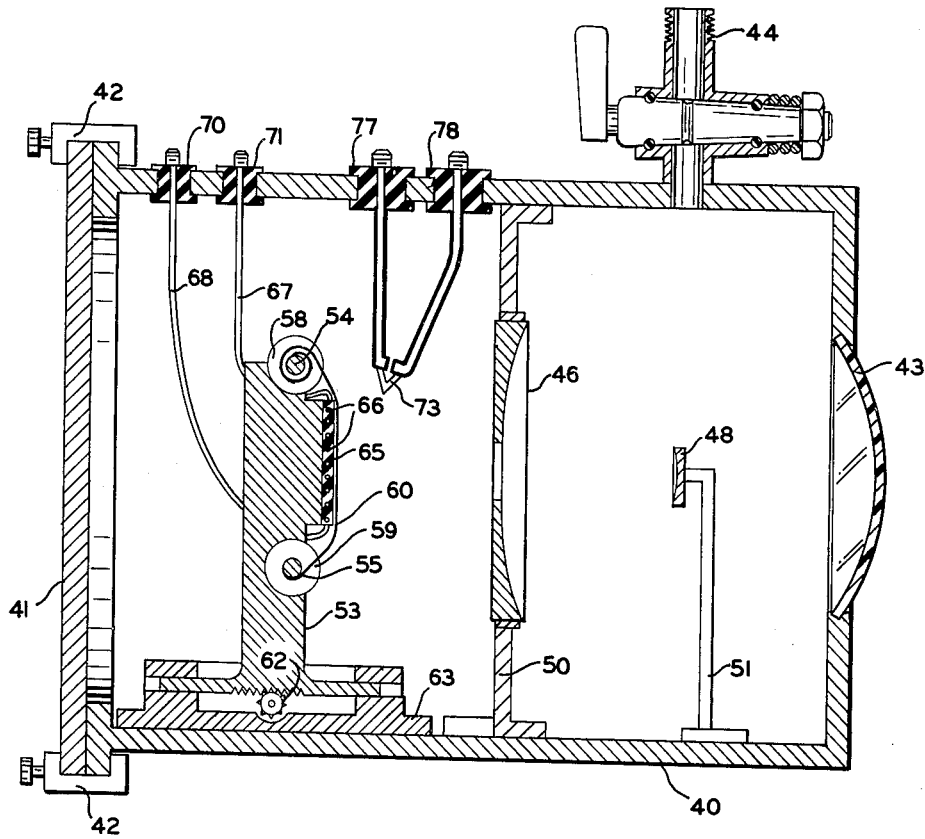

FIGURE 3 is still another embodiment of the invention employing components similar to those indicated in FIG. 2, except that here a mirror arrangement is used to intensify and magnify a weak source of information-bearing infrared radiation.

The source of infrared radiation used for the purposes of this invention need have no specific wave-length characteristics. It is preferred, however, when the substrate is at or near room temperature to use infrared radiation having a wave length of about 10 microns. However, infrared radiation having wave lengths from about 3 to 30 microns can be employed in this invention. Other sources of infrared radiation, such as those emanating from living organisms which are above the temperature of their surroundings, also are detectable. The infrared radiation can be modulated by any conventional technique and indeed need not be modulated at all, as where one wishes simply to produce a visible record of infrared radiation.

The system of focussing can be any which is transparent to, or capable of refracting, infrared radiation. Either optical or catoptrical systems can be used. In general, such focussing means are well known to those skilled in the art and do not form a part of the present invention. Greater sharpness of image may be achieved by employing monochromatic or narrow bands of infrared radiation (using suitable filters), but this is not always convenient, as for example, when recording radiation of low intensity from a distant source.

The substrate surface used as the image-recording medium may be generally defined as having low heat capacity and low rate of thermal conductivity. The substrate surface should also be one which displays substantially no vapor pressure under the particular conditions of reduced pressure which are employed.

By the term "low rate of thermal conductivity," reference is had to the rate of transfer of heat from one point to another of the substrate especially laterally along the surface of the recording medium. For purposes of this invention, useful thermal conductivity is that of the order of the thermal conductivity of sheet mica, baryta paper, polyethylene terephthalate film and the like. It will be apparent that sharper images will be obtained when the conductivity is very low, but that useful recordings are made even if outlines may be somewhat diffuse.

The heat capacity of the substrates used in this invention is important because the rate at which the recording surface of the image recording media becomes increased in temperature when struck by infrared radiation is affected by the heat capacity. Low heat capacity increases the rate at which a given intensity of impinging radiation raises the temperature of a unit area of the surface. The desired result is the formation of an invisible "image" or localized increase in surface temperature wherever the infrared image falls on the substrate. The higher the temperature differential between image and non-image portions, the greater will be the contrast.

The heat capacity of the recording medium is conveniently made small by providing thin substrates, or thin surface recording films having desirable lateral conductivity properties on supports having very low conductivity.

Those materials which provide strongly anisotropic thermal conductivity characteristics and which have substantially no vapor pressure under the particular pressures employed are most desirable for use as substrates in this invention. Thus, it is preferred that the thermal conductivity be several orders of magnitude lower in the plane parallel to the surface than at right angles to the surface.

It is desirable that the image recording medium have a rather high density and substantial impermeability to gases.

Suitable materials for the substrate surface of the image recording medium are baryta paper (high quality paper stock coated with a thin film of gelatin highly filled with finely divided barium sulfate); sheet mica; glass; condenser paper, synthetic resin films such as polyester, polystyrene and the like film; paper coated with finely divided zinc oxide in an organic binder such as Pliolite S–7 (30/70 mol ratio butadiene-styrene copolymer) and the like.

It is preferred that substrate surfaces used for image recording media be presensitized prior to exposure to an infrared image in accordance with the teachings of this invention by being exposed to the vapor of a material having a higher heat of vaporization than that used to develop the image formed by the infrared radiation. In general, it is sufficient that there be deposited by conventional vacuum vapor deposition techniques, using vapor pressures at least of the order of $10^{-4}$ millimeters of mercury, from about $10^{12}$ to $10^{15}$ atoms of material per square centimeter of surface. The resulting coating is invisible. However, such deposited material serves to presensitize the surface of an image recording medium by forming what can be termed nucleation sites, which make it easier to deposit the "developing" metal vapor on the substrate. These nucleation sites then, in turn, aid in producing the selective deposition of vapor during image development (with consequent good contrast and resolution of image).

Suitable materials useful for presensitizing the surface of the image-recording media include nickel, silver, copper, cuprous chloride, bismuth, bismuth oxide, and other materials. The exact choice of material in any given instance, of course, is dependent upon the vapor pressure of the material used for image development. As explained, the prenucleation or presensitizing material should have a heat of vaporization greater than that associated with the material used for development. Precoating or presensitizing techniques are described by Barth in U.S. Patent 2,702,760.

In general, the material used for development need have no special characteristics. In the event that the surface of the recording medium used in any given instance is presensitized, one will use a material for image formation which has a heat of vaporization somewhat lower than that of the substance used for presensitization. In general, it is preferred to use materials for image development which can be vaporized under vacuum conditions with relatively low amounts of energy, which materials have, under atmospheric temperatures and pressures, a solid state. Metals which are very useful for this purpose, are the relatively lower melting metals, especially zinc and cadmium.

In general, it is preferred to employ reduced pressures of below about $10^{-2}$ millimeters of mercury, and preferably a pressure at least as low as about $10^{-4}$ millimeters, within the chamber wherein the infrared image is being recorded upon the substrate surface. Reduced pressures of about $10^{-2}$ to $10^{-8}$ mm. of mercury may be used.

The exact mechanism by which the selective vapor deposition takes place in accordance with the teachings of this invention is not known, but it is believed to be associated with the increase in local surface temperatures of the substrate of the recording medium.

Referring to the drawings, it will be seen that in FIGURE 1 the apparatus used consists of a housing formed by bell-jar-shaped transparent cover 3 (which may be of glass or suitable synthetic resin or plasic thick enough to withstand evacuation) together with base plate 4. This housing is evacuated by making a suitable connection between a conventional pump means (not shown) and the exhaust port 5. The focussing means employed is a concave reflector 6, which is supported on the base by bracket 8 and focusses the infrared radiation from the source 7 here illustrated by a filament (energized electrically by leads, not shown, extending through the insulating supports 9 and 10 to a source of electrical energy) on the image recording medium or substrate 13 supported on bracket 15. In this simple embodiment of the invention the reflector is conveniently made movable with respect to the image recording medium so that focussing can be accomplished. A filament 11 adapted for electric heating is located near the substrate 13, and supported by insulated supports 12 and 14. Electrical conductors, not shown, extend through supports 12 and 14 and base plate 4 and are connected to the respective ends of filament 11 to supply electrical current from external means (also not shown) for heating when desired. Alternatively, the substrate heating wires can be replaced by cooling means, for example, thermoelectric junctions made of dissimilar metals which are cooled by the Peltier effect when current is passed through them; or tubes for circulation of cooling liquids, etc. A small piece of cadmium wire 16 is hung on filament 11 to supply metallic vapors. The chamber pressure is reduced to about $10^{-4}$ mm. Hg. After the image of the source has been focussed on the substrate, and while the image remains on the substrate or substantially immediately after it is removed (i.e., while the substrate remains affected thereby) the image is rendered visible by depositing cadmium on the substrate. To accomplish this, filament 11 is heated and cadmium metal wire 16 is volatilized. This metallic vapor condenses on the surface of the recording media 13 wherever the infrared image does not impinge. Vapor deposition is continued until the image appears to be of satisfactory contrast as determined visually.

Either a positive or negative image record is obtained depending on the recording medium employed, as set forth hereinbelow.

FIGURE 2 shows another embodiment of the invention consisting of housing 20 which may be of square or round cross-section, provided with air-tight back closure 21 held in place by clips 22 and with a lens-tube 23, carrying infrared transparent lens 25 and focusable by suitable means 26 here shown as a simple threaded sleeve. A conventional packing gland 24, or other arrangement is used to provide a seal against leakage of air into the housing through the threaded area. Alternatively (not shown) the focussing means is external of a suitable infrared transmissive window in the housing, through which the infrared radiation is focussed on the image-recording medium. The lens 25 is constructed of infrared transmissive material such as halite or sapphire. A viewing port (not shown here) may be provided in the casing to determine when focus is achieved for visible light or heat sensitive means for focussing may be provided, e.g., a retractable thermocouple at a focal point, adjustment being made to a maximum reading. Housing 20 is provided with an evacuation port and cock 27, for reduction of pressure. A shutter (not shown) may be incorporated in lens tube 23 or exposure may be controlled by external means covering lens 25. The image recording medium 28 is supported on the back closure 21 by supports 29. Filament 30, made of tungsten wire and attached to electrically conducting supports 32 and 34, which are insulated from the housing and extend therethrough, is adapted to be heated electrically.

A small piece of low-melting metal wire 36, for example cadmium, is hung over filament 30. When the filament is heated, the cadmium melts and supplies metallic cadmium in vapor form.

In operation, the image of an object which is emitting infrared radiation is focussed on the recording medium. Concurrently with formation of the ordinarily invisible image of the external infrared radiating object, on the recording medium 28, formation of an image is effected by energizing filament 30 to produce cadmium vapor from the wire 36. Although it might be expected that infrared radiation from the metal vaporizing development might also be recorded, the fact that there is no focussing thereof on the recording medium appears to prevent any serious interference or fogging.

Referring to FIGURE 3, the embodiment shown consists of a housing 40 having air-tight back cover plate 41 attached by clamps 42, infrared transparent aperture 43 and evacuation port and cock 44. Within the casing are mounted mirrors 46 and 48 on supports 50 and 51, respectively, and constituting a catoptric focussing system. Supporting means 50 is arranged to form a baffle extending across the housing from side to side and top to bottom, thus forming two chambers in the housing 40, communication between these being by way of the aperture in mirror 46. Located in a plane normal to incident rays from the focussing system is a support 53, having reel mounting means 54 and 55 for holding supply reel 58 and takeup reel 59 which are adapted to store, advance and receive a recording medium or substrate in strip form 60. The support is adjustable for fore and aft movement by means of rack and pinion 62 and slide bearing mount 63.

A platen 65 is provided for support of the recording medium. Embedded in the platen are electrical resistance heating wires 66, which with flexible leads 67 and 68 extending through insulators 70 and 71 and connected to a conventional, adjustably regulated source of electrical power (not shown here) form part of a continuous electrical circuit. Filament 73, of tungsten, is supported by leads 74 and 75 which extend through insulators 77 and 78 and are adapted to be connected with a conventional, adjustable and controllable source of electricity. In this way, filament 73 is energized when desired to provide a supply of metallic vapor. Conveniently, this is accomplished by suspending a wire "V" of the desired metal, e.g., zinc or cadmium, on the filament, heating the filament until the wire just melts. A bead is formed which remains on cooling and can be remelted for providing zinc or cadmium vapor (respectively) until it is completely evaporated. Infrared radiation sources at various distances from the infrared transparent aperture 43 are brought into focus on the image recording medium 60 by means of precalibrated indicia (not shown) external of the housing operating through the rack and pinion 62 to show the correct position of support 53.

In operation, a strip of the selected recording medium, for example, baryta paper, is placed in the apparatus, which is then pumped down to about $10^{-4}$ mm. Hg. An infrared image is focussed on the substrate. While the image is on the substrate, or substantially immediately after cessation of exposure, the image is developed.

Development of the image is effected by the metal vapors, e.g., of cadmium, produced by heating filament 73 and the associated lower melting metal, to a point above the melting point of cadmium for a period of time previously determined empirically to produce a useful image consistent with the amount of incident infrared radiation. The developed image is white where the image fell and "black" (dark grey, metallic) in non-image areas. It consists of metal and is stable under ordinary conditions. A series of further images may be recorded by advancing the strip form image-recording medium on the takeup reel 57, until the roll of image-recording medium has been consumed.

When the baryta paper is prenucleated with $Bi_2O_3$, the image which is formed is dark and non-image areas are light grey to white.

When desired, the platen can be heated or cooled by means of wires 66. In this way, the substrate temperature can be raised or lowered to obtain special effects, because the condensation rate of the atoms and molecules of the vapor or beams is altered thereby. Better results are obtained with infrared radiation of longer wave lengths when the substrate is cooled to lower temperatures, say 0° C. or below, prior to exposure.

As is known, the metallic vapor used for development eventually coats all surfaces inside the chamber, on which it condenses. Accordingly, baffles are used where possible to help prevent occlusion of lenses or mirrors, but it is recognized that eventually cleaning of the apparatus will be necessary to restore its efficiency.

What is claimed is:

1. A process for recording information conveyed by means of infrared radiation, which comprises exposing the surface of a substrate having low heat capacity and low rate of thermal conductivity, maintained under a pressure at least as low as about $10^{-2}$ to $10^{-8}$ mm. Hg, to an infrared radiation image to form thereupon areas of differential temperatures, and substantially simultaneously therewith condensing upon the surface of said substrate vapors of a metal to form an image on the surface thereof corresponding to said areas by selective deposition of metal.

2. A process for recording information conveyed by means of infrared radiation, which comprises exposing the surface of a substrate sheet having low heat capacity and low rate of thermal conductivity to an infrared radiation image, while maintaining the said substrate sheet under a pressure of about $10^{-2}$ to $10^{-8}$ mm. Hg; and, substantially concomitantly therewith, selectively condensing metal from the vapor state upon the surface of said substrate sheet in accordance with the affinity of metal vapor for the respective areas of impingement and non-impingement of the said infrared image.

3. A process for recording information conveyed by means of infrared radiation, which comprises exposing the surface of a substrate sheet having low heat capacity and low rate of thermal conductivity to an infrared radiation image, while maintaining the said substrate sheet under a pressure of about $10^{-2}$ to $10^{-8}$ mm. Hg; and, substantially concomitantly therewith, condensing zinc from the vapor state upon the surface of the said substrate sheet wherever the infrared image does not impinge.

4. A process for recording information conveyed by means of infrared radiation, which comprises exposing the surface of a substrate sheet having low heat capacity and low rate of thermal conductivity to an infrared radiation image, while maintaining the said substrate sheet under a pressure of about $10^{-2}$ to $10^{-8}$ mm. Hg; and, substantially concomitantly therewith, condensing cadmium from the vapor state upon the surface of the said substrate sheet wherever the infrared image does not impinge.

5. A process for recording information conveyed by means of infrared radiation, which comprises exposing the surface of a baryta paper sheet to an infrared radiation image, while maintaining the said sheet under a pressure of about $10^{-2}$ to $10^{-8}$ mm. Hg; and, substantially concomitantly therewith, condensing cadmium upon the surface of the said sheet wherever the said infrared image does not impinge.

(References on following page)

References Cited by the Examiner

UNITED STATES PATENTS

| | | | |
|---|---|---|---|
| 2,237,314 | 4/1941 | Queneau et al. | 117—107 X |
| 2,431,923 | 12/1947 | Dimmick | 117—93.3 X |
| 2,552,209 | 5/1951 | Murray | 117—17.5 |
| 2,556,132 | 6/1951 | Ball | 117—107.1 X |
| 2,847,330 | 8/1958 | Toulmin | 117—107.1 X |
| 2,870,315 | 1/1959 | Lindsay | 118—49.1 X |
| 2,872,341 | 2/1959 | Stein | 118—49.1 X |
| 2,923,651 | 2/1960 | Petriello | 117—107.1 X |
| 2,953,484 | 9/1960 | Tellkamp | 117—107 X |
| 3,064,260 | 11/1962 | Heiland | 346—109 |
| 3,081,699 | 3/1963 | Gulko | 101—149.2 |

FOREIGN PATENTS

| | | |
|---|---|---|
| 685,758 | 1/1953 | Great Britain. |
| 869,661 | 3/1953 | Germany. |

OTHER REFERENCES

Holland: Vacuum Deposition of Thin Films, 1956, pp. 1, 181, 182 and 257–261.

WILLIAM D. MARTIN, *Primary Examiner.*